(12) United States Patent
Sherlock et al.

(10) Patent No.: US 8,655,337 B2
(45) Date of Patent: Feb. 18, 2014

(54) OPERATING A SERVER TO DETERMINE MODEL OF MOBILE TERMINAL

(75) Inventors: Gerard Sherlock, St Albans (GB); John D R Pilkington, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 13/254,995

(22) PCT Filed: Feb. 12, 2010

(86) PCT No.: PCT/GB2010/000252
§ 371 (c)(1),
(2), (4) Date: Sep. 6, 2011

(87) PCT Pub. No.: WO2010/100397
PCT Pub. Date: Sep. 10, 2010

(65) Prior Publication Data
US 2012/0003983 A1   Jan. 5, 2012

(30) Foreign Application Priority Data
Mar. 5, 2009   (EP) ................................. 09250635

(51) Int. Cl.
*H04M 3/00*   (2006.01)
(52) U.S. Cl.
USPC ............ 455/418; 455/419; 455/420; 455/466
(58) Field of Classification Search
None
See application file for complete search history.

(56) References Cited

U.S. PATENT DOCUMENTS

| | | | |
|---|---|---|---|
| 2003/0027581 A1* | 2/2003 | Jokinen et al. | 455/456 |
| 2004/0082346 A1* | 4/2004 | Skytt et al. | 455/456.3 |
| 2005/0096016 A1* | 5/2005 | Tervo et al. | 455/414.1 |
| 2009/0228606 A1* | 9/2009 | McCarthy et al. | 709/248 |

FOREIGN PATENT DOCUMENTS

| | | |
|---|---|---|
| EP | 1 308 858 | 5/2003 |
| WO | WO 03/012574 | 2/2003 |
| WO | WO 2005/043789 | 5/2005 |

OTHER PUBLICATIONS

TIA Document, IP-Based Over-the-Air Handset Configuration Management (IOTA-HCM), TIA-1010, Aug. 2003, Telecommunications Industry Association.
International Search Report for PCT/GB2010/000252, mailed May 28, 2010.
Written Opinion of the International Searching Authority for PCT/GB2010/000252, mailed May 28, 2010.

* cited by examiner

*Primary Examiner* — Suhail Khan
(74) *Attorney, Agent, or Firm* — Nixon & Vanderhye P.C.

(57) ABSTRACT

A determines the model of a mobile device and delivers configuration parameters to the mobile device consistent with the model determined. The application server captures the mobile device's phone number and associates it with a generated unique identifier. The unique identifier is sent to the mobile device as part of a URL. When the mobile device accesses the URL, the request sent to the application server includes the unique identifier as well as a user agent header. The model number of the mobile device can be extracted from the user agent header, and thus the model number can be tied to the mobile device's phone number by way of the unique identifier. The model number and phone number association can be used to correctly configure applications for use on the mobile device.

7 Claims, 2 Drawing Sheets

OPERATING A SERVER TO DETERMINE MODEL OF MOBILE TERMINAL

This application is the U.S. national phase of International Application No. PCT/GB2010/000252 filed 12 Feb. 2010, which designated the U.S. and claims priority to EP Application No. 09250635.1 filed 5 Mar. 2009, the entire contents of each of which are hereby incorporated by reference.

TECHNICAL FIELD

This invention relates to a method of determining the model of a mobile terminal, in particular a method of operating a server for determining the model of a mobile device and for delivering configuration parameters to the mobile device consistent with the model determined.

BACKGROUND

There are services or clients built into many mobile devices today that can be set up and managed remotely. Examples of these include the SyncML client for synchronizing contact and calendar information, and Microsoft's Device Management Client for updating application and operating system upgrades. In order to bring these clients under the remote control of a server, it is necessary to set up a trusted relationship between the mobile device and the server wishing to take control of the client on the mobile device.

The protocol used to set up these clients needs to be formatted correctly to work. The formatting of the protocol is usually dependent on the precise model of the mobile device. Many mobile phone models do not display the model number of the device on the external casing which means that a very large proportion of customers do not know the model number of their mobile phone.

This is particularly problematic where the service provider offering the service is not also a mobile operator and so does not have access to the mobile network data on the home location register from which the model of the device can otherwise be determined.

Current implementations of services typically ask the user to enter in the IMEI (the international mobile equipment identity number) associated with the mobile phone so that the operator can determine the mobile model number (as the first eight digits of an IMEI give the TAC code of the device, which is uniquely associated with a specific model number). However, unless a user happens to know this code, the user might be asked to obtain it by turning off their phone and look for the model information that this typically held on an identification sticker/plate under the battery. This is hardly efficient from a user's perspective. A second method commonly used invites the customer to select their phone model by identifying it from a number of pictures on a web site. However, this is prone to error as many models from a phone manufacturer now look similar to one another. A further method is to ask the user to key in a special code *#06# into the mobile phone to get the phone to return the IMEI on the screen. However, this still requires the user to correctly note down the resulting 15 digit number and then key this into appropriate system, which is prone to user error.

BRIEF SUMMARY

It is the aim of exemplary embodiments of the present invention to address one or more of the above-stated problems.

According to one aspect of the present invention, there is provided a method of operating a server for determining the model of a mobile terminal in a wireless network, said method comprising:
  i) generating a unique identifier associated with the mobile subscriber identity of the mobile terminal, and storing the unique identifier with the mobile subscriber identity;
  ii) sending a message to the mobile terminal using the mobile subscriber identity, wherein the message comprises the unique identifier;
  iii) receiving a resource request from the mobile terminal in response to the sent message, said resource request comprising a user agent header and the unique identifier;
  iv) determining a mobile terminal model from said user agent header and associating it with the mobile subscriber identity of the mobile terminal using the unique identifier; and
  v) providing a service to the mobile terminal in dependence on the determined mobile terminal model number.

Preferably, the sent message comprises a resource locator identifying a process on the server, said resource locator having the unique identifier as a parameter, and wherein said process is adapted to initiate the method of step iv).

In the examples, the mobile terminal model typically comprises a manufacturer identifier and a model number. Further, the step of determining the mobile terminal model can comprise parsing the user agent header to extract the manufacturer identifier and the model number, and verifying the extracted manufacturer identifier and model number with a predetermined list of stored manufacturer identifiers and model numbers.

The message sent in step ii) may be a short message service message.

The service provided may be a mobile client configuration service adapted to the determined mobile terminal model number.

According to a second aspect of the present invention, there is provided a server for determining the model of a mobile terminal in a wireless network, said server adapted to:
  generate a unique identifier associated with the mobile subscriber identity of the mobile terminal, and to store the unique identifier with the mobile subscriber identity;
  send a message to the mobile terminal using the mobile subscriber identity, wherein the message comprises the unique identifier;
  receive a resource request from the mobile terminal in response to the sent message, said resource request comprising a user agent header and the unique identifier;
  determine a mobile terminal model from said user agent header and associate it with the mobile subscriber identity of the mobile terminal using the unique identifier; and
  provide a service to the mobile terminal in dependence on the determined mobile terminal model number.

Thus, from a user's perspective, all that is required is that they type in their mobile phone number into a web site, and then react to a message sent to the mobile phone's messaging inbox. However, those simple actions made are sufficient to the method to determine the model number of the phone and configure the required application. In alternative examples, the mobile phone number can be obtained from an SMS message, provided over an interactive voice response system or similar system.

BRIEF DESCRIPTION OF THE DRAWINGS

For a better understanding of the present invention, reference will now be made by way of example only to the accompanying drawings, in which.

DESCRIPTION OF PREFERRED EMBODIMENTS

The present invention is described herein with reference to particular examples. The invention is not, however, limited to such examples.

In examples of the present invention, there is proposed a method of operating a server for determining the model of a mobile device and for delivering configuration parameters to the mobile device consistent with the model determined. The application server captures the mobile device's phone number and associates it with a generated unique identifier. The unique identifier is sent to the mobile device as part of a URL. When the mobile device accesses the URL, the request sent to the application server includes the unique identifier as well as a user agent header. The model number of the mobile device can be extracted from the user agent header, and thus the model number can be tied to the mobile device's phone number by way of the unique identifier. The model number and phone number association can be used to correctly configure applications for use on the mobile device.

Figure 1:
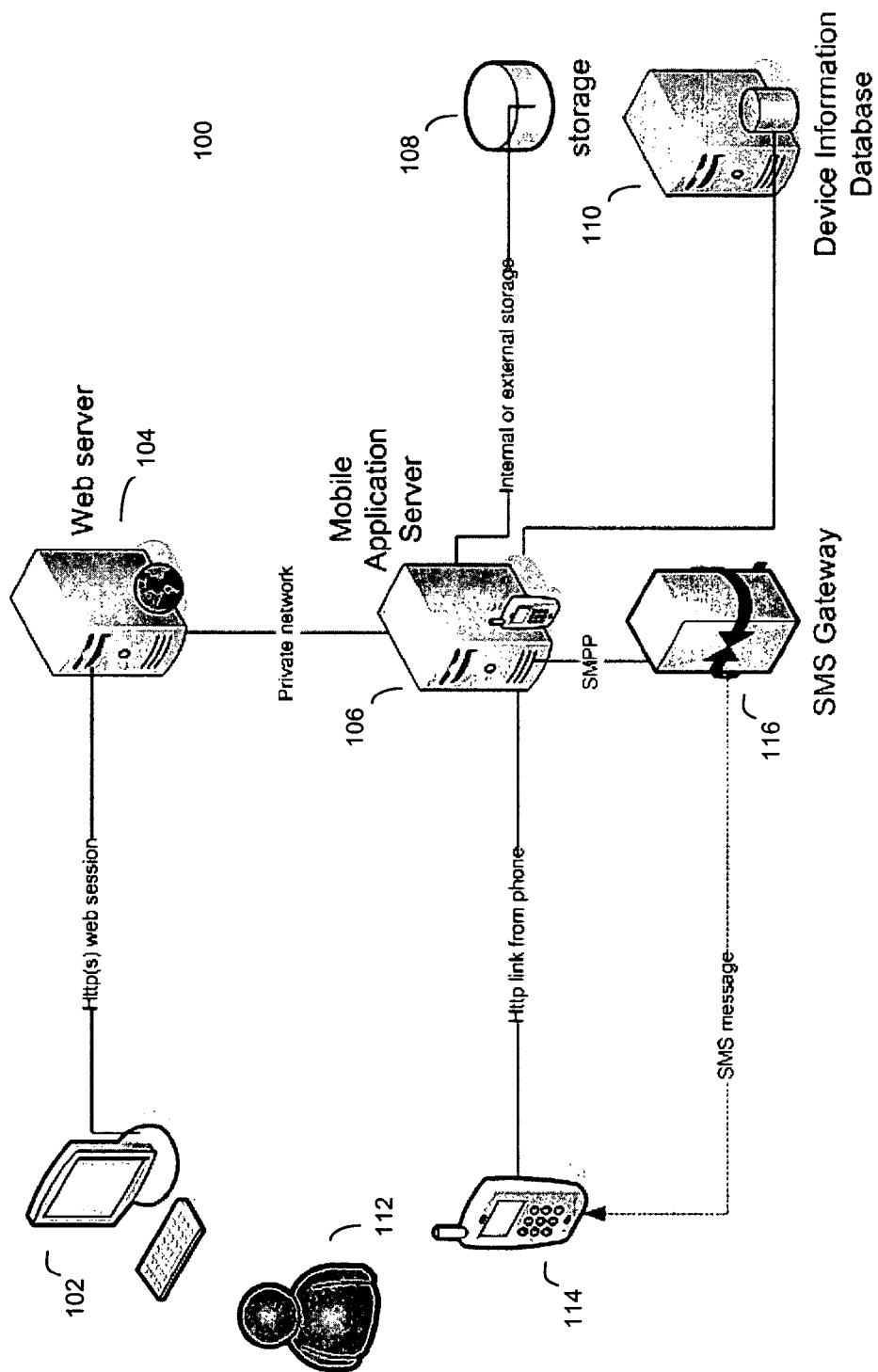
FIG. 1 is a system diagram of an example of the present invention.

Referring to FIG. 1, there is shown a system 100 comprising a PC 102 connected to a web server 104 over a suitable network such as the Internet. The web server 104 may be connected over a private network to a mobile application server 106. The system 100 also includes a mobile device 114, such as a mobile phone, which can connect to the mobile application server 106 over a wireless mobile network such as a GSM or 3G network. The mobile application server 106 also has access to local storage 108, which may be internal to the mobile application server or external. The mobile application server 106 also has access to a device information database 110. The mobile application server 106 can send SMS messages to the mobile terminal 114 by way of an SMS gateway 116.

The web server 104 and mobile application server 106 are both managed by the same service provider, which is offering a phone contact back-up service for example. This service requires an installed application on the device to be suitably configured in one of the three methods set out below. Broadly speaking, the first method is initiated using a web browser based portal, the second via an inbound SMS message, and the third is a voice driven Interactive Voice Response service.

Figure 2:
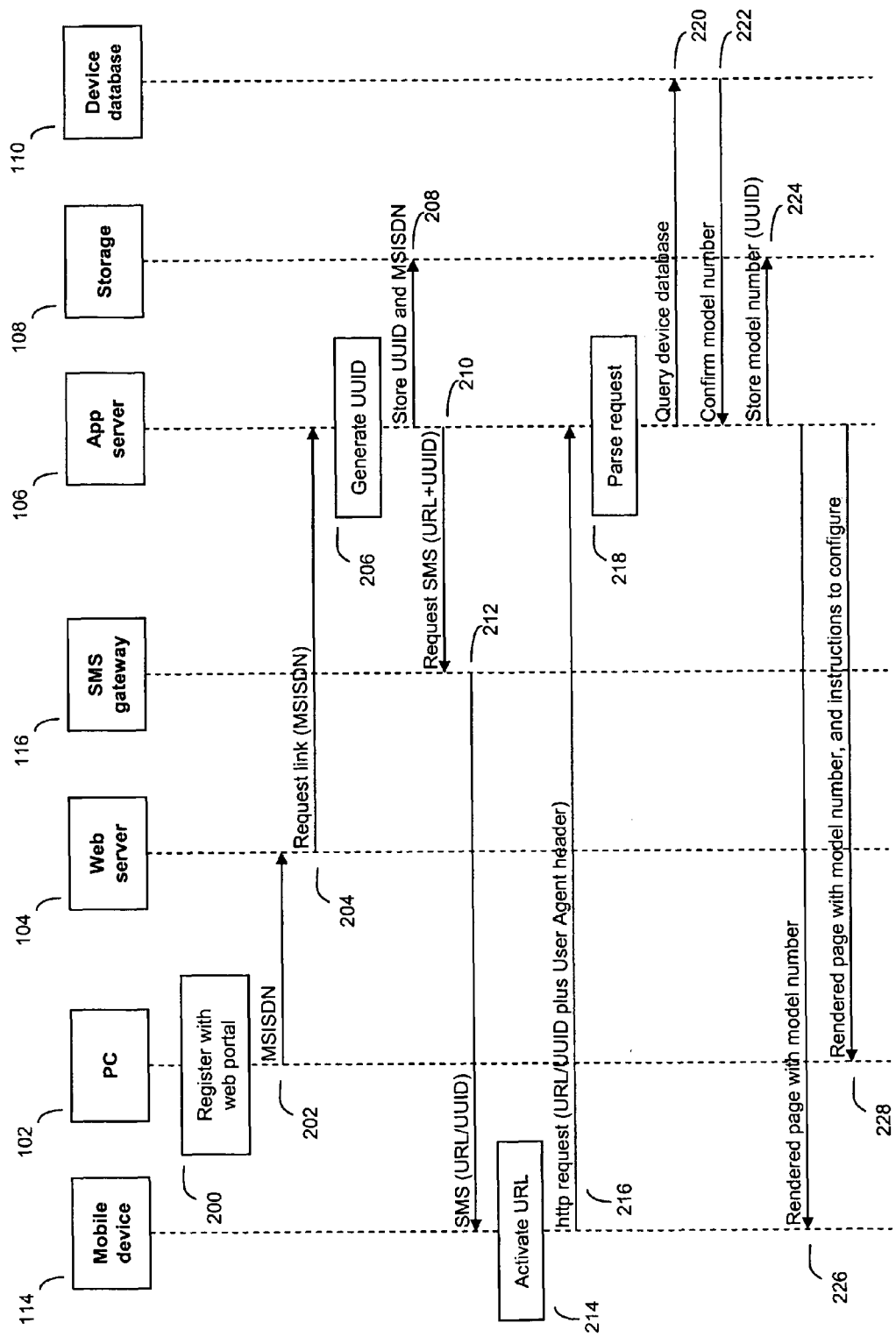
FIG. 2 is a message flow diagram of an example of the present invention.

The specific operation of the web browser based system will first be described with reference to the message flow diagram of FIG. 2. References in FIG. 2 to the elements found in FIG. 1 are made using like reference numerals. In this example, a user registers with a service provider which configures an application, formatted for the model of the mobile device, which provides a service that backs-up the address book of the mobile device.

In step 200, a user 112 registers with a service provider's web portal, provided by web server 104, via an Internet browser on the user's PC 102. As part of the registration process, the user has to provide the mobile phone number, or MSISDN, of the mobile device 114 for which the user wishes to have the address book backed up. The user may also be asked to enter a username/password as part of the registration, which can be used later to transfer user-specific data to the device. The MSISDN is sent to the web server 104 in step 202. The registration and sending of the MSISDN is preferably done over a secure connection, such as a HTTPS (hypertext transfer protocol secure) web session.

Following receipt of the MSISDN, the web server 104 sends a request to the application server 106 for a URL to be generated and sent to the mobile terminal identified by the MSISDN received. The request for a suitable application is sent in step 204 and includes the MSISDN. The request may take the form of an HTTPS request.

In step 206, the application server 106 generates a unique identifier to associate with the MSISDN received in the request. In a preferred example, the unique identifier is a Universally Unique Identifier (UUID), through other similarly unique identifiers may be used. The UUID specification is described in more detail in IETF RFC 4122. The UUID and associated MSISDN are stored in the local storage 108 in step 208.

In step 210, the application server 106 sends a request to the SMS gateway 116 to format and send an SMS to the mobile terminal identified by the MSISDN provided. The request is typically made over a SMPP (short message peer to peer) link between the application server 106 and the SMS gateway 116. The requested SMS is to include a URL (universal resource locator) to a process on the application server 106. The URL also includes the UUID generated by the application server.

An example of the URL to be included in the SMS is:
http://www.serviceprovider.com/register/
   activate.pl?u=<UUID>

The SMS gateway 116 sends an SMS message to the mobile terminal 114 with the above described URL and UUID combination in step 212.

The SMS is received by the mobile terminal 114, and the user can open the SMS and select the embedded URL in step 214. By selecting the URL, the mobile terminal 114 opens up a suitable Internet connection on a web browser on the phone and makes an HTTP (hypertext transfer protocol) request directed at the URL provided in step 216. The URL calls a process on the application server, in this case the "activate" process running on the "serviceprovider.com/register" folder. Furthermore, the HTTP request made by the mobile device 114 in step 216 also includes a User Agent header. The header is generated by the web browser on the mobile device 114 making the request. The header can contain information relating to the mobile device 114, the operating system and the like, and can vary depending on the specific browser.

In an example of the invention, the browser generates a User Agent header that contains a reference to the model number of the phone. To give an example, the user agent header generated by a Nokia 6111 phone is:
Nokia6111/2.0 (03.70) Profile/MIDP-2.0 Configuration/
   CLDC-1.1

When the application server 106 receives the HTTP request, the called process analyzes the request in step 218, and parses the UUID and the user agent header from the request. The UUID is identified by the parameter "u" in the URL, and the process is also takes the User Agent header string and extracts the associated mobile device model. The user agent header is analyzed by a parser, which reads the full text string and searches for a manufacturer tag in the string. Thus, in the example above, the text string "Nokia6111/2.0 (03.70) Profile/MIDP-2.0 Configuration/CLDC-1.1" is read, and the manufacturer tag of "Nokia" is located. Most mobile phones have a model number following the manufacturer name in the user agent header. Thus, the parser finds the text "Nokia" and then reads in the text "6111" and compares this to the information stored the device database in step 220, which has stored a database of mobile phone manufacturers and model numbers. This step provides a check on the extracted mobile manufacturer and model number to confirm their validity. Sometimes the extracted model number can turn out to be a variant, and thus require a slightly different setting. The application thus now has both the UUID of the mobile terminal as well as the model number. By communicating with the storage 108, which has stored UUIDs and corresponding MSISDNs as a result of step 208, the application server 106 can map the mobile phone model number to the MSISDN by way of the UUID. This mapping between the model number and the MSISDN is stored in the storage 108.

With knowledge of the model number of the mobile device 114, the application server 106 can retrieve the appropriate instructions for configuring the exact model of the mobile device 114. Thus, a suitable response with instructions for configuring the mobile device 114 can be sent back to the mobile device 114 in step 226 and/or the PC 102 in step 228. The instructions may include instructions for downloading further configuration files, for example, by way of further links to download applications. These links could also utilize the UUID to identify the mobile terminal (by way of the stored association between the UUID and the MSISDN).

With knowledge of the model number of the mobile device 114, the application server 106 can retrieve the appropriate instructions for configuring the exact model of the mobile device 114. Thus, a suitable response with instructions for configuring the mobile device 114 can be sent back to the mobile device 114 in step 226 and/or the PC 102 in step 228. The instructions may include instructions for downloading further configuration files for example by way of further links to download applications. These links could also utilise the UUID to identify the mobile terminal (by way of the stored association between the UUID and the MSISDN).

An example of configuration is for the application server to run a process that formats a binary SMS message to provision the client already installed on the mobile device with the credentials of the service provider's service, for instance using a method defined in the OMA-CP (Open Mobile Alliance Client Provisioning) or OMA-DM (Open Mobile Alliance Device Management) standards.

An example of such a client is the standards based OMA-DS (DS-data synchronization) or SyncML (Synchronization Markup Language) client that the mobile device could be set up to do address book back up. Using the OMA-CP protocol, in-built clients on mobile devices can be set up with the correct settings for e-mail, MMS, contact synchronization and so on, dependent on the manufacturer.

Another example of this is the USER PIN based bootstrapping of a device used under OMA-DM for building a trust relationship between a mobile device and a device management server. In this case a binary SMS message is sent to the mobile device which prompts a user for a PIN to complete the process. In this instance the PIN to be entered would be displayed to the user in the web browser at the PC.

In an alternative example of the present invention, a user who is already known to the service provider, either through existing products or another mechanism, uses the mobile device 114 to send an SMS message directed at the application server 106 starting with a specific keyword to a known number. The SMS message is routed to an application which can then create a UUID as in step 206 above. The mobile network routing the SMS will add the MSISDN of the sending mobile terminal 114, thus the application can associate and store the UUID with MSISDN. This alternative SMS based registration method can replace steps 200 to 204, with step 206 onwards proceeding as described before.

There is also envisioned a system whereby the registration steps of 200 to 204 are replaced by Interactive Voice Response (IVR) based setup. In an IVR arrangement, the mobile device's phone number (MSISDN) is identified by either using the calling line identification process of the IVR platform at the application server, or the user may be asked to type in their mobile phone number directly.

In the examples described above, the application server 106, storage 108 and device database 110 have been shown as separate entities. However, a person skilled in the art will appreciate that they may form part of the same physical entity and only functionally separated.

Furthermore, while the registration process described above is initiated by a PC 102, it will be appreciated by a skilled person that the same process can be initiated (step 200) by the mobile device 114 itself, or from some other device configured with a suitable browser such as a laptop, home tablet device, or games console device (like a Sony PSP).

In general, it is noted herein that while the above describes examples of the invention, there are several variations and modifications which may be made to the described examples without departing from the scope of the present invention as defined in the appended claims. One skilled in the art will recognise recognize modifications to the described examples.

What is claimed is:

1. A method of operating a server for determining a model of a mobile terminal in a wireless network, said method comprising:
   i) generating a unique identifier associated with a mobile subscriber identity of the mobile terminal, and storing the unique identifier with the mobile subscriber identity;
   ii) sending a message to the mobile terminal using the mobile subscriber identity, wherein the message comprises a resource locator identifying a process on the server, said resource locator having the unique identifier as a parameter;
   iii) receiving a resource request from the mobile terminal in response to the sent message, said resource request comprising a user agent header comprising the unique identifier;
   iv) determining the mobile terminal model from said user agent header and associating the mobile terminal model with the mobile subscriber identity of the mobile terminal using the unique identifier; and
   v) providing a service to the mobile terminal in dependence on the determined mobile terminal model.

2. The method as claimed in claim 1, wherein said process adapted to initiate the method of step iv).

3. The method as claimed in claim 1, wherein the mobile terminal model comprises a manufacturer identifier and a model number.

4. The method as claimed in claim 3, wherein the step of determining the mobile terminal model comprises parsing the user agent header to extract the manufacturer identifier and the model number, and verifying the extracted manufacturer identifier and model number with a predetermined list of stored manufacturer identifiers and model numbers.

5. The method as claimed in claim 1, wherein message sent in step ii) is a short message service message.

6. The method as claimed in claim 1, wherein the service provided is a mobile client configuration service adapted to a determined mobile terminal model number.

7. A server for determining a model of a mobile terminal in a wireless network, said server adapted to:
   generate a unique identifier associated with a mobile subscriber identity of the mobile terminal, and storing the unique identifier with the mobile subscriber identity;
   send a message to the mobile terminal using the mobile subscriber identity, wherein the message comprises a resource locator identifying a process on the server, said resource locator having the unique identifier as a parameter;

receive a resource request from the mobile terminal in response to the sent message, said resource request comprising a user agent header comprising the unique identifier;

determine the mobile terminal model from said user agent header and associating the mobile terminal model with the mobile subscriber identity of the mobile terminal using the unique identifier; and provide a service to the mobile terminal in dependence on the determined mobile terminal model.

\* \* \* \* \*